United States Patent Office 3,216,062
Patented Nov. 9, 1965

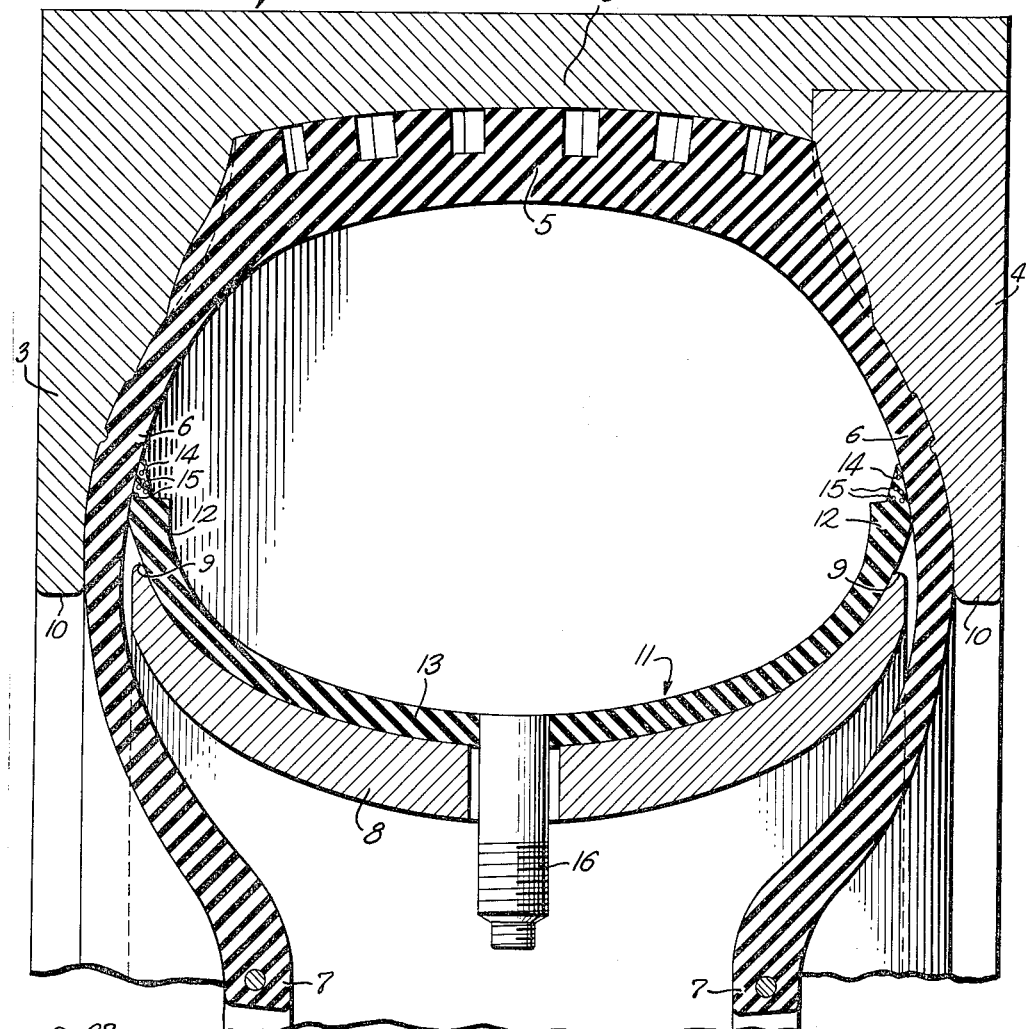
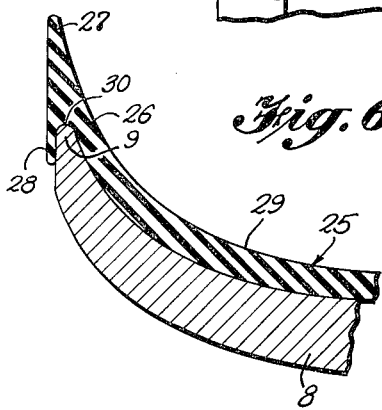

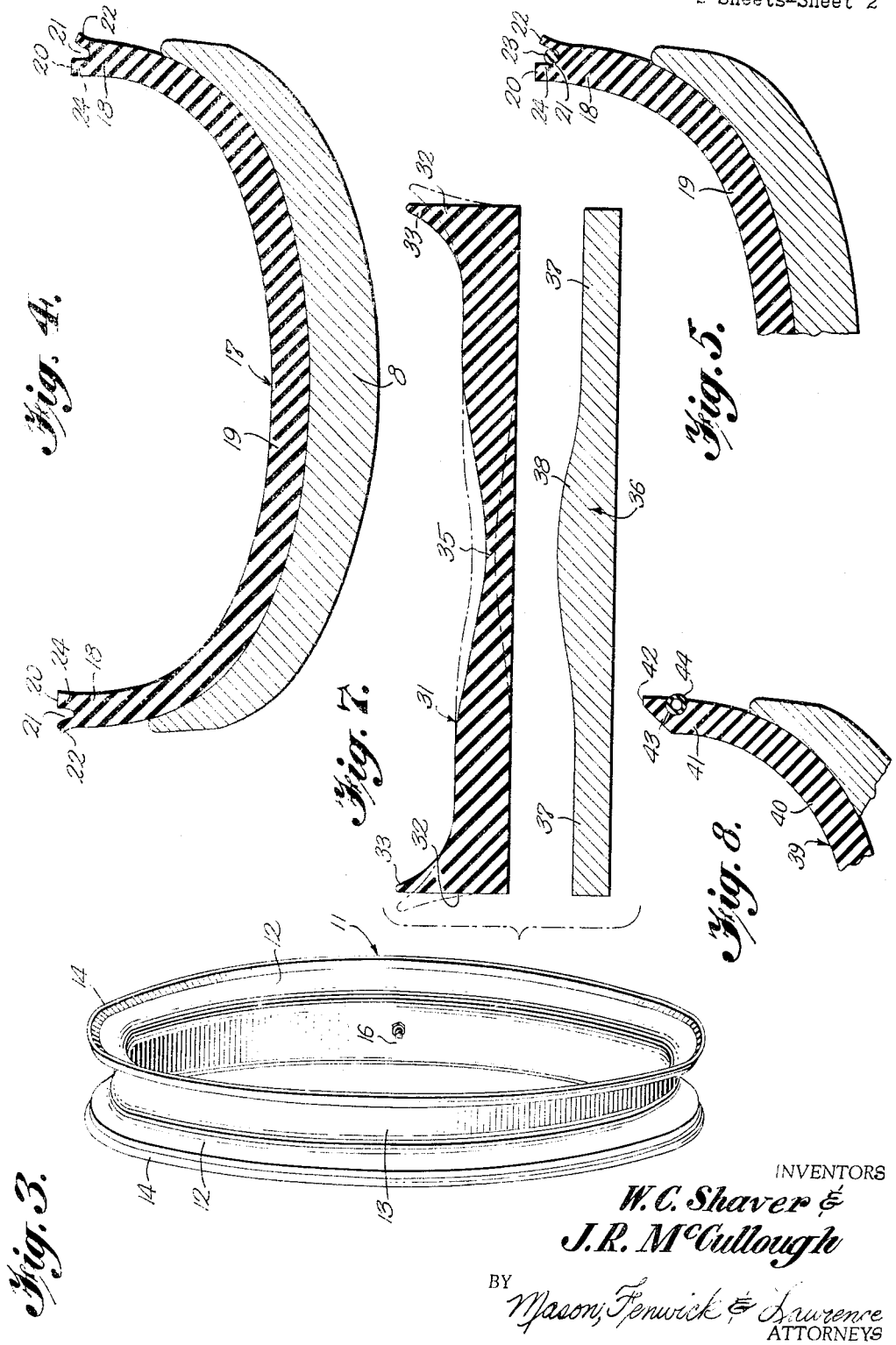

3,216,062
SEALING DIAPHRAGM FOR TIRES
William C. Shaver and James R. McCullough, Macon, Ga., assignors to Clement O. Dennis, Macon, Ga.
Filed Apr. 18, 1962, Ser. No. 188,455
4 Claims. (Cl. 18—45)

This invention relates to tire sealing diaphragms for use with tire casings during retreading operations to permit admission of air under pressure directly into the casing to force the tire into the tread design of the mold.

In almost all tire retreading processes, the tire with a layer of uncured rubber on it is forced into the tread design of a heated mold by air pressure and held there under pressure until the rubber is cured. The pressure is obtained by inserting an air tube in the tire and inflating it so that it reacts against a curing rim. In most cases, the rim is a collapsible one that fits inside the tire walls between the skirts or side pressure plates of the mold. This type of rim allows the tire walls to flex to adjust themselves to the mold skirts to fit closely within the mold. This frequently leaves a gap on each side of the rim between the rim and the tire sidewalls. This necessitates the use of curing tubes of thick wall construction to prevent the tubes from blowing out through the gap. Even though heavy tubes are used, blowouts still occur, and folding of the thick walled tubes in inserting and removing them from tires causes the tubes to crack and fail. This entails great loss, as the heavy tubes are quite expensive, and labor is increased due to the necessity to reprepare a tire after a blowout occurs.

It has been proposed to dispense with curing bags and use a circular diaphragm to span the space between the sidewalls of a tire with the diaphragm edges in sealing relation with the inner wall surface of the tire, so that the tire is airtight and can hold the air pressure necessary to seat the tire in the tread design of the mold and hold it there during curing. Prior devices of this nature have included metal reinforcing in the diaphragm either to make the diaphragm self-supporting to eliminate use of a curing rim, or as a mechanical means to urge the diaphragm edges into contact with the tire sidewalls. These devices have had little or no commercial acceptance, because the incorporation of metal reinforcing to obtain a seal has made the diaphragm so stiff that proper sealing contact through the full extent of the tire walls has been impossible. The sealing problem has been further increased by the introduction of tires having closely spaced ribs extending radially of the side walls.

The principal object of the present invention is to provide a diaphragm for pressure sealing a tire which will make continuous sealing contact with the tire sidewalls, irrespective of irregularities of surface contour of the tire.

A more specific object is the provision of a diaphragm of the above type, having very pliable lips along its side edges, to permit automatic adjustment of the lip to irregularities of surface contour of the tire sidewalls.

Another object is to provide a tire diaphragm which incorporates means to assure outward inclination of the sealing lips for initial contact with the tire sidewalls, while maintaining complete flexibility for perfect sealing.

A further object of the invention is to provide a diaphragm which has means to assure centering of the diaphragm and curing rim to assure equal extension of the diaphragm at the sides of the rim for proper seating in the tire.

Other objects of the invention will become apparent from the following description of practical embodiments thereof, when taken in conjunction with the drawings which accompany and form part of this specification.

In the drawings:

FIGURE 1 is a radial section through one side of a tire retreading mold with a tire in the mold and a back-up rim and pressure sealing diaphragm in place therein;
FIGURE 2 is a portion of the diaphragm shown in FIGURE 1, as it appears removed from the tire;
FIGURE 3 is a perspective view of a complete diaphragm;
FIGURE 4 is a radial section through one side of a diaphragm of slightly modified construction, shown with a back-up rim;
FIGURE 5 is a partial section, similar to FIGURE 4, showing the diaphragm of FIGURE 4 with means inserted to maintain outward disposition of the pressure sealing lip;
FIGURE 6 is a view similar to FIGURE 5, illustrating another modified diaphragm construction;
FIGURE 7 is a radial section through one side of a diaphragm and flat back-up rim, the diaphragm being shown in full line when not under pressure, and in dotted lines against the rim and in sealing position; and,
FIGURE 8 is another view similar to FIGURE 5, showing still another modified form of diaphragm.

In general, the invention concerns the use of an annular diaphragm to span the distance between the sidewalls of a tire to be retreaded, and having flexible lips along its annular edges for sealing contact with the inner walls of the tire to provide an airtight space within the tire, so that the air pressure needed to force the new tire rubber into the tread pattern of the mold can be obtained by pumping the air directly into the tire casing. The diaphragm is to be used in conjunction with a standard inside curing rim, and the sealing lips of the diaphragm will be sufficiently flexible to seal against the tire walls, regardless of the surface of the tire wall.

Referring to the drawings in detail, and first adverting to that form of the invention illustrated in FIGURES 1 to 3, there is shown in FIGURE 1 one side of a retreading mold 1, having a tread matrix 2 and side skirts 3 and 4. The side skirt 4 is shown removable for ease in inserting and removing tires. The tire consists of the usual tread section 5, sidewalls 6 and beads 7. What is known as an inside rim 8 is shown in position in the tire. The rim illustrated is of the type shown in the patent to Napier, No. 2,398,151, which is a cast rim of several separate arcuate sections having radial end faces, so that several sections may fit together in end abutting relation to form a circular rim. With the type mold and curing rim shown, the rim fits well up into the tire, so that its edges 9 are at about the plane of the inner edges 10 of the retreading mold shown to hold the tire sidewalls against movement from the mold skirts and (in normal practice) support an air tube over its entire exposed arc between the sidewalls of the tire to prevent blowout of the tube.

The present invention proposes to dispense with the conventional air tube and fill the tire itself with air to create the pressure needed to press the tread rubber into the tread pattern of the mold. The tire is made airtight by means of an annular diaphragm 11, which seats upon the curing rim and has its side portions 12 in contact with the inner surfaces of the sidewalls of the tire.

The diaphragm is made of rubber, or a similar resilient and flexible material, and its central web section 13 is of considerable thickness, comparable to that of the walls of a conventional curing tube. Most curing tubes are oval, or eliptical, in cross-section, and the diaphragm has the shape of one-half a curing tube divided along the long axis. This shape will allow the diaphragm to seat properly on a conventional curing rim and bring its side portions into contact with the sidewalls of a tire.

The side portions of the diaphragm terminate in sealing lips 14, which are of considerably less thickness than the center web of the member and, therefore, will be much more pliable than the center web. It is to be noticed that the lips taper toward their extreme ends, so that their terminal edges are quite thin and will adjust themselves under pressure to any contour of the tire wall. It has been found that with a diaphragm of pliable rubber and a thin lip, the lip will follow closely the tire wall contour, even of those tires having the sidewalls stiffened by radially extending ribs on the inside of the sidewalls. With this type of tire, the sealing lip will follow closely the ribs and intervening valleys of the wall structure.

The lips 14 will have an initial position wherein their free edges will be spaced apart a distance greater than the spacing between tire sidewalls, so that the lips will make firm contact with the tire walls when inserted and hold that position while air under pressure is admitted to the tire. Repeated use of the diaphragm with the lips turned inward, as shown in FIGURE 1, with the mold being heated for each retreading operation, will cause the lips to take a set in the operative position. If this occurs, the lips are no longer resiliently urged against the tire walls prior to the introduction of air, and sealing around the entire periphery becomes difficult. To avoid this possibility, a plurality of nylon cords 15, or cords having similar characteristics, are embedded in the sealing lips 14. These cords extend circumferentially of the diaphragm in the form of closed loops. Nylon, when heated, will contract. As the lips are at the outside edges of the diaphragm, contraction of the cords will pull toward the center, causing the lips to swing outwardly each time the heated diaphragm is removed from a tire. This positions the lips as shown in FIGURE 2, outwardly diverging, ready for initial resilient contact with the walls of a tire with which the diaphragm will be used next. When the diaphragm is placed in a tire, firm contact between the sealing lips and the tire walls will be made, so that when air is admitted, a seal will be made instantly and no air will be lost. Air will be admitted to the interior of the tire through an air valve 16, carried by the diaphragm.

FIGURES 4 and 5 show a slightly modified form of diaphragm. Here the diaphragm 17 has edge portions 18 of substantially the thickness of the central web 19. In order to obtain the thin pliable lip necessary for sealing, the edges 20 of the diaphragm are grooved around their entire peripheries, as at 21, to divide the edge portions into two members, with the outer member being a continuous flexible lip 22. Under normal circumstances, the lips will be inclined outwardly to provide for quick initial contact with the sidewalls of a tire, similar to the manner of contact of the lips of the diaphragm previously described.

It has been found that in some cases, after repeated heatings in a mold, the lips take a set in an inwardly compressed position and no longer make proper initial contact with the tire walls. It is possible to bias the lips 22 to outward position by inserting rings 23 of resilient material into grooves 21. The rings will be of greater cross-sectional diameter than the width of the grooves, so that the rings will be compressed and provide the resilient bias required to urge the lips to outward position. The inner sections 24, on the opposite sides of the grooves from the lips, are considerably heavier than the lips, so that they will serve as abutments against which the rings 23 may bear to force the lips outwardly.

In this form, as with the previous one, the thin, pliable lip is resiliently urged into initial contact with the tire walls before insertion of the diaphragm in the tire, and the lip will tend to conform to tire wall contour. When air pressure is built up in the tire, the lips will be pressed into sealing contact with the tire walls.

In FIGURE 6 a still further modification is shown. In this form the diaphragm 25 is similar to the form first described, in that the edge portions 26 taper to form thin, pliable sealing lips 27. It differs from the previous form in having peripheral skirts 28 depending from the edge portions 26 in spaced relation to the central web 29, forming annular pockets 30. When the diaphragm is put into position on a curing rim 8, skirts 29 will be snapped over the side edges of the rim, so that the rim edges will be seated in the pockets 30. This construction serves a twofold purpose: it centers the diaphragm relative to the rim, and the overlying of the skirts on the rim edge tends to bias the sealing lips 27 outwardly to proper position for initial tire wall contact.

Another form of diaphragm with a special flat rim is shown in FIGURE 7. The diaphragm 31 in this case is relatively flat, with upstanding wall flanges 32 at either side, terminating in thin sealing lips 33. The bottom 34 of the diaphragm is flat. The central web is the same thickness at each side and tapers toward the center to provide a mid-section 35, which is comparatively thin.

The rim 36, with which the flat diaphragm is to be used, has edge portions 37 of equal thickness and increases in thickness toward the center to provide a raised central rib 38. By having the outer diameter of the edge portions 37 of the rim and the inner diameter of the edge portions of the diaphragm substantially the same, these portions of the two will fit one upon the other. The thin central section of the diaphragm, however, will be somewhat stretched and raised to overlie the central rib 38 of the rim. Lifting the center portion of the diaphragm will deform it, causing the sidewalls 32 to swing outwardly, as shown in dotted lines in FIGURE 7, to incline the sealing lips 33 to the proper angle for initial contact with the tire walls.

Yet another form of the diaphragm is shown in FIGURE 8. Here the diaphragm 39 is substantially the shape of the one illustrated in FIGURE 1, having a central web 40, edge portions 41, and sealing lips 42. An auxiliary sealing means is provided, however. The edge portions of the diaphragm have grooves 43 in their outer surfaces, inwardly of the sealing lips, to seat sealing rings 44 of very soft rubber. Rings 44 will provide back-up seals to assure airtight relation between the diaphragm and the tire.

It will be noted that in all of the diaphragms disclosed, thin, pliable sealing lips are provided along the side extremities of the diaphragm for sealing contact with the inner walls of a tire being retreaded. In most instances, some means is provided to bias the sealing lips to outwardly divergent angular positions, so that they will project beyond the other portions of the diaphragms to insure good initial contact with the tire walls before air is admitted to the interior of the tire. The means for securing the bias is different in each instance.

While in the above several embodiments of the invention have been disclosed, it will be understood that the details of construction shown and described are merely for purposes of illustration, and the invention may take other forms within the scope of the appended claims.

What is claimed is:

1. A diaphragm for use with a curing rim in a tire being retreaded to bridge the space between the tire sidewalls to make the tire capable of holding air under pressure, comprising an annulus of pliable, resilient material concavely curved from edge to edge in transverse cross-section, the annulus having a central web portion to seat upon a curing rim and side edge portions which will project beyond the sides of a rim for contact with the interior surfaces of the sidewalls of a tire, the side edge portions terminating in outwardly tapering sealing lips having thin, free edges to conform in sealing relation to the interior surfaces of a tire sidewall when pressed against the tire sidewalls, and means wholly within the sealing lips to bias the sealing lips to outwardly diverging positions.

2. A diaphragm as claimed in claim 1, wherein the lip biasing means are nylon cords, endless circumferentially of the annulus, embedded in the sealing lips.

3. A diaphragm for use with a curing rim in a tire being retreaded to bridge the space between the tire sidewalls to make the tire capable of holding air under pressure, comprising an annulus of pliable, resilient material concavely curved from edge to edge in transverse cross-section, the annulus having a central web portion to seat upon a curing rim and side edge portions which will project beyond the sides of a rim for contact with the interior surfaces of the sidewalls of a tire, the side edge portions terminating in outwardy tapering sealing lips having thin, free edges to conform in sealing relation to the interior surfaces of a tire sidewall when pressed against the tire sidewalls, the sealing lips being grooved circumferentially on their outer surfaces, and soft, flexible sealing rings seated in the grooves and projecting beyond the surface of the annulus.

4. A diaphragm for use with a curing rim in a tire being retreaded to bridge the space between the tire sidewalls to make the tire capable of holding air under pressure, comprising an annulus of pliable, resilient material having an interior surface concavely curved from edge to edge and an exterior surface convexly curved from edge to edge transversely of the annulus, the annulus having a central web portion to seat upon a curing rim and side edge portions which will project beyond the sides of a rim for contact with the interior surfaces of the sidewalls of a tire, the annulus having grooves peripherally of its edges closely adjacent the exterior surface of the annulus to form thin flexible sealing lips between the grooves and the exterior surface of the annulus for conforming contact with the interior surfaces of a tire, and O-rings in the edge grooves of the annulus of greater cross-section than the width of the grooves to turn outwardly the sealing lips.

References Cited by the Examiner
UNITED STATES PATENTS

| | | | |
|---|---|---|---|
| 1,942,797 | 1/34 | Bittaker | 18–45 |
| 2,453,223 | 11/48 | Henderson. | |
| 2,495,100 | 1/50 | Henderson. | |
| 2,516,191 | 7/50 | Englesson. | |
| 2,524,156 | 10/50 | Bacon | 18—18 |
| 2,597,550 | 5/52 | Trit | 18—45 |
| 2,873,479 | 2/59 | DiPietro | 18—45 |
| 2,987,769 | 6/61 | Frohlich | 18—45 |
| 3,133,317 | 5/64 | Branick | 18—45 |

WILLIAM J. STEPHENSON, *Primary Examiner.*

MICHAEL V. BRINDISI, *Examiner.*